Jan. 9, 1951 A. G. GURRIES ET AL 2,537,267
CABLE WINCH
Filed Aug. 21, 1946 3 Sheets-Sheet 1

INVENTORS
A. G. Gurries
T. B. Keesling
BY
ATTORNEYS

Jan. 9, 1951     A. G. GURRIES ET AL     2,537,267

CABLE WINCH

Filed Aug. 21, 1946     3 Sheets-Sheet 3

INVENTORS
A. G. Gurries
T. B. Keesling
BY

ATTYS

Patented Jan. 9, 1951

2,537,267

UNITED STATES PATENT OFFICE 2,537,267

CABLE WINCH

Albert G. Gurries, Gilroy, Calif., and Thomas B. Keesling, Orlando, Fla., assignors, by direct and mesne assignments, to Be-Ge Manufacturing Co., Gilroy, Calif., a corporation of California Application August 21, 1946, Serial No. 691,938

1 Claim. (Cl. 254—187)

This invention relates to improvements in cable winches such as are adapted to be mounted on a tractor and driven from the power take-off shaft of the latter; this type of cable winch being commonly known as a power control unit.

One object of this invention is to provide a cable winch which includes, in direct unitary relationship with each cable drum, a clutch unit of novel construction and operation; such clutch unit being fluid pressure actuated, preferably hydraulically.

Another object of the present invention is to provide a clutch unit, as in the preceding paragraph, which comprises, in combination with a cable drum rotatably but axially immovably mounted on a driven shaft, a non-flexible clutch disc disposed in concentric cooperative relation to one end head of the cable drum, said one end head of the cable drum being formed exteriorly with a flat radial clutch face, the disc being mounted on and driven by the shaft but axially movable therealong; a diaphragm plate fixed with said one end head in facing cooperative relation to the clutch disc on the opposite side from said end head but for rotation therewith; a closure member mounted in connection with and covering the diaphragm plate from the outside so as to form a pressure chamber therebetween; and means to deliver fluid pressure to said chamber whereby to cause the diaphragm plate to deflect axially inwardly and to drivingly engage the clutch disc between said diaphragm plate and said clutch face. The closure member is a dome which clears the diaphragm plate, except at its periphery, and thus forms a pressure chamber of substantial capacity, whereby a cushioned clutch action results, and a nicety of clutch control is accomplished.

An additional object of the invention is to provide a cable winch which incorporates, in rugged, compact and unitary relationship, a pair of cable drums; a fluid pressure actuated clutch unit for each thereof; a fluid pressure actuated brake assembly for each cable drum; a fluid pump to supply the pressure for control of the above clutch units and brake assemblies; and a fluid reservoir formed in the main case of the winch and interposed in the fluid pressure control system thereof.

A further object of the invention is to provide a practical cable winch, and one which is exceedingly effective for the purpose for which it is designed.

These objects are accomplished by means of such structure and relative arrangement of parts as will fully appear by a perusal of the following specification and claim.

Figure 1:
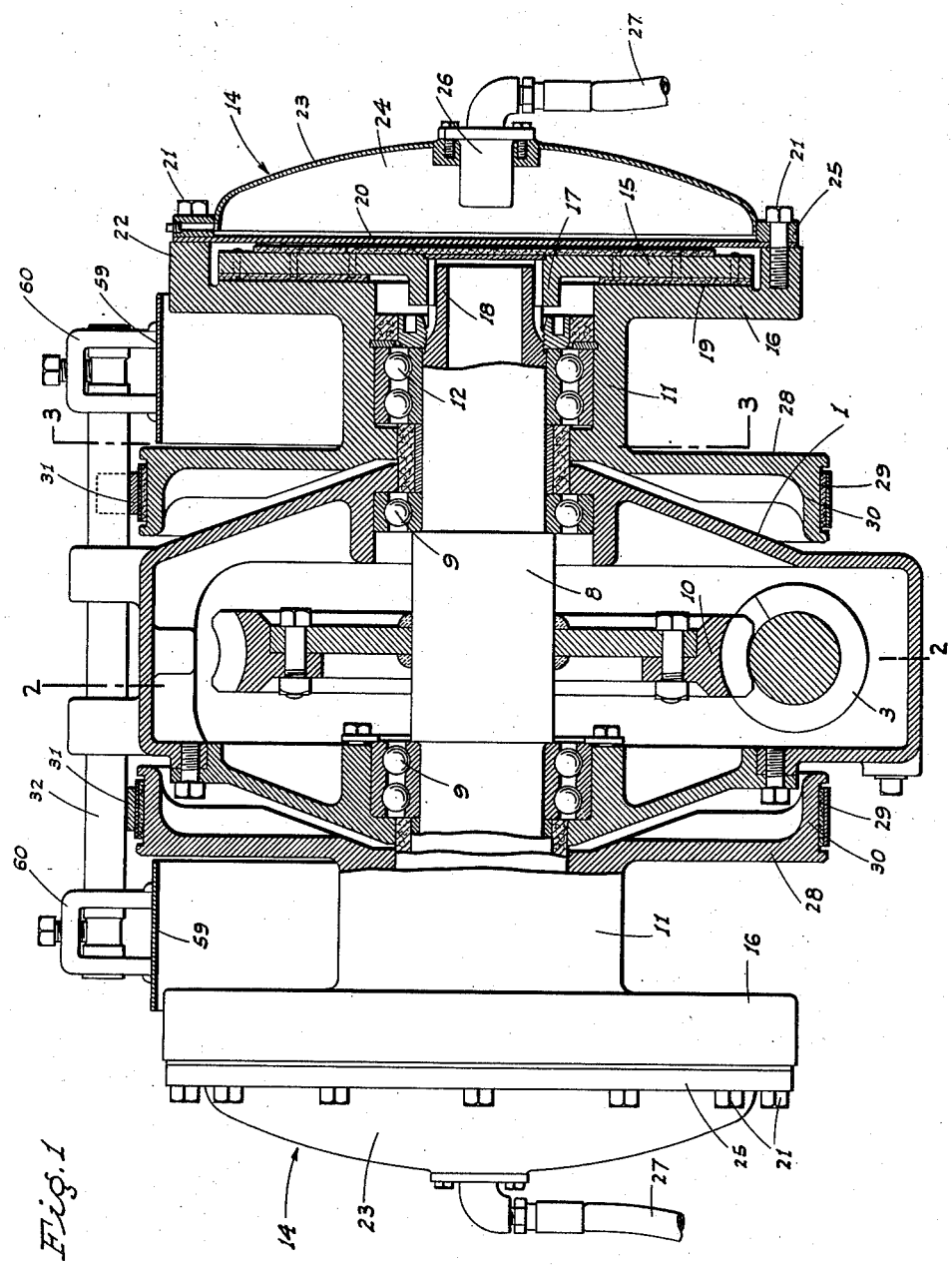
Fig. 1 is a longitudinal sectional elevation of the cable winch taken on line 1—1 of Fig. 2.

Referring now more particularly to the characters of reference on the drawings, the cable winch comprises a main case, indicated generally at 1, and formed at the front thereof with an attachment plate or face 2 adapted to be connected in abutting relationship to a corresponding part of the tractor adjacent the power take-off shaft thereof.

In the bottom portion thereof the main case 1 is provided with a transversely extending worm 3 carried, adjacent opposite ends, in bearings indicated at 4 and 5.

At its front end the worm 3 includes a spindle 6 disposed in a pocket 7; said spindle 6 being adapted to aline with, and to be connected in driven relation to, the power take-off shaft of the tractor.

Above the worm 3, and at right angles thereto, the winch includes a heavy-duty main shaft 8 which extends axially through said winch, being supported from the case, at opposite ends thereof, by bearings 9.

Within the case the main shaft 8 is fixed with a heavy-duty worm gear 10, which runs in mesh with the worm 3, whereby the power from the tractor as transmitted through the spindle 6, worm 3, and worm gear 10, causes rotation of the main shaft 8.

At opposite ends the main shaft 8 projects out of the case 1, and these projecting end portions of the shaft rotatably but axially immovably support a pair of cable drums, each of which is indicated at 11. The cable drums are supported, from the end portions of the main shaft 8, by means of bearings 12. Suitable seals, indicated generally at 13, are arranged in association with the bearings 9 and 12.

At the outer end thereof each cable drum 11 is fitted with a fluid pressure actuated clutch unit, indicated generally at 14, and as these clutch units are identical a description of one will suffice for both. Each such clutch unit is constructed as follows:

A circular non-flexible clutch disc 15, of substantial thickness, is disposed in concentric cooperative relation to the outer end head 16 of the cable drum 14. The clutch disc 15 is formed with a center hub 17 splined, as at 18, in connection with the adjacent outer end of the main shaft 8 for axial movement with respect thereto, but for driving by said shaft.

The clutch disc 15 is provided with suitable clutch facing on opposite sides thereof, as shown, and said clutch disc runs in cooperative relation to a flat radial clutch face 19 formed on the outside of the end head 16.

A relatively thin circular diaphragm plate 20, preferably of steel, is disposed in concentric cooperative relation to the clutch disc 15 on the side thereof opposite the end head 16; said diaphragm plate 20 being fixed, at the periphery, by a circumferential row of bolts 21, to an annular, axially outwardly projecting flange 22 on the end head 16. The diaphragm plate 20 is thus mounted for rotation with said end head 16.

In the normal position of the above parts, the clutch disc 15 runs free between the clutch face 19 of end head 16 and the diaphragm plate 20, whereby the cable drum 11 is then stationary.

Beyond or outwardly of the diaphragm plate 20, the clutch unit includes a dome 23 which covers said diaphragm plate and forms a pressure chamber 24 on the side thereof opposite the clutch disc 15; the dome 23 being fixed, at the periphery, to said diaphragm plate 20, and to the flange 22, by means of an annular and peripheral securing ring 25 likewise held in place by the bolts 21.

To supply fluid under pressure to each chamber 24 there is provided a rotary fitting 26 centrally mounted in connection with each dome 23, and a fluid pressure supply conduit 27 which is coupled to each fitting 26. The conduits 27 are incorporated in a valve controlled, fluid pressure system, hereinafter described in detail.

Each clutch unit 14 functions in the following manner:

The shaft 8 is constantly driven, rotating the clutch disc 15. However, as previously described, such rotation of the clutch disc 15 is not normally imparted to the cable drum 11. To cause rotation of the cable drum 11, fluid under pressure is introduced from the corresponding conduit 27 through the adjacent fitting 26 into the pressure chamber 24; the fluid preferably being oil under pressure. The fluid pressure as introduced in chamber 24 causes an axially inward deflection of the diaphragm plate 20, whereby the clutch 15 is then frictionally engaged or clamped between said diaphragm plate and the clutch face 19 of the end head 16. When this occurs the cable drum 11 is coupled in driven relation, by the clutch unit, to the main shaft 8; the drum running in a direction to wind the cable (not shown) thereon.

Each of the cable drums 11 is normally maintained against rotation in a cable pay-out direction by a set or "on" brake assembly. As said brake assemblies are identical a description of one will suffice for both. Each such brake assembly is constructed as follows:

The inner end head 28 of each cable drum 11 is formed, at the periphery, with a brake drum 29; and a brake band 30, of slightly less than a full circle in circumference, encircles the brake drum 29 between vertically spaced points at the front of the winch.

At one end the brake band 30 is formed with a lug 31 which bears downwardly against a cross shaft 32 supported exteriorly on the main case 1 at the front thereof. At its opposite end, which is a short distance vertically above the lug 31, the brake band 30 is provided with another lug 33. A bellcrank lever 34 is mounted on a cross shaft 35, and said lever has one leg thereof projecting above the lug 33, and said leg carries a roller 36 which bears against such lug from above. When the upstanding leg of the bellcrank lever 34 is swung in a counter-clockwise direction, the brake band 30 is tightened and the brake set. Motion of the bellcrank lever in an opposite direction releases the brake.

A fluid pressure actuated power cylinder 37 is disposed on top of the main case 1 and includes a projecting piston rod 38 having an attachment clevis 39 thereon. The power cylinder 37 is pivoted, as at 40, and extends toward the upstanding leg of the bellcrank lever 34; the clevis 39 being pivoted, as at 41, to the upper end of said upstanding leg.

A heavy-duty compression spring 42 surrounds the piston rod 38, within the cylinder 37, between the piston 43 and the end of said cylinder adjacent the bellcrank lever 34, whereby said spring normally retracts the piston and swings the bellcrank lever 34 in a brake setting direction. Thus, with the described arrangement each brake is normally in set or "on" position. To release each brake, fluid under pressure is fed through a conduit 44 into the end of the cylinder 37 opposite the rod 38, causing advance of the piston 43 against the compression of spring 42, and causing projection of the rod 38 which results in brake release motion of the bellcrank lever 34.

If, for any reason, fluid pressure should not be available to release each brake, brake release can be effected manually by an upstanding hand lever 45 on shaft 35 adjacent bellcrank lever 34; the hand lever 45 having a boss 46 projecting laterally in intersecting relation to the upstanding leg of lever 34. If hand lever 45 is swung in a clockwise direction the boss 46 engages and moves the lever 34 in a brake release direction.

Figure 2:
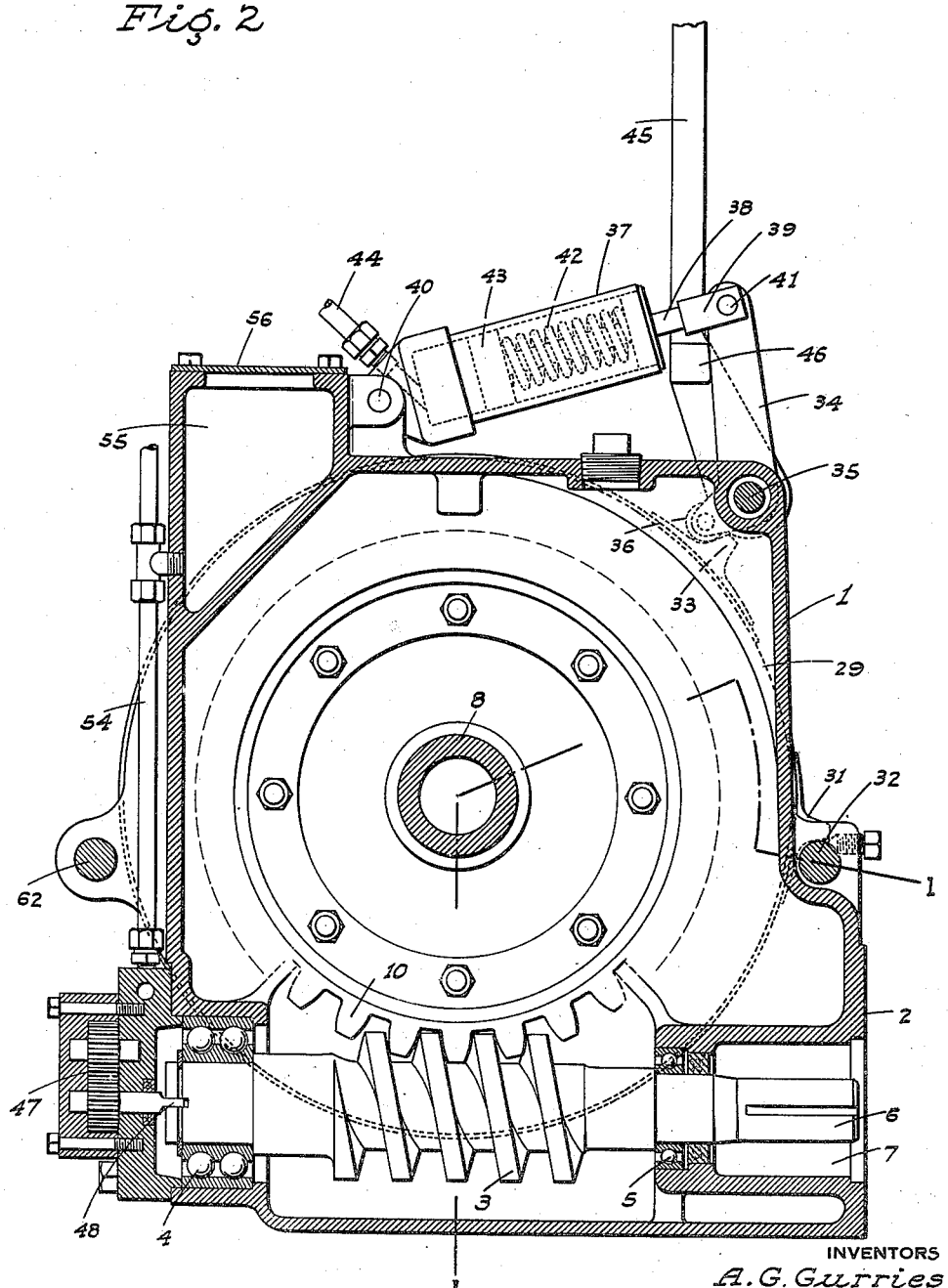
Fig. 2 is a cross section taken on line 2—2 of Fig. 1.
Figure 3:
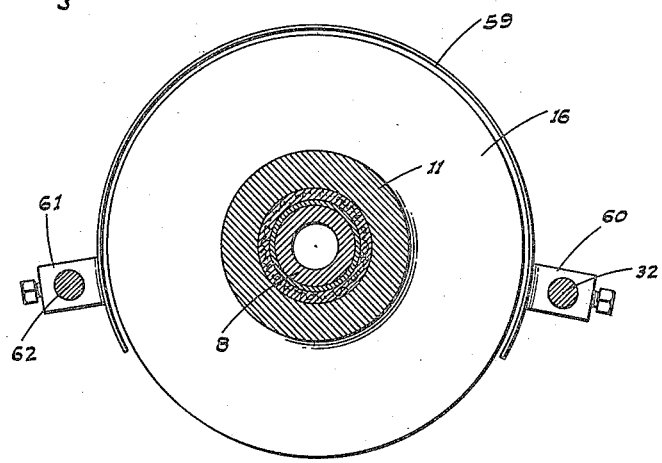
Fig. 3 is a cross section taken on line 3—3 of Fig. 1.
Figure 4:
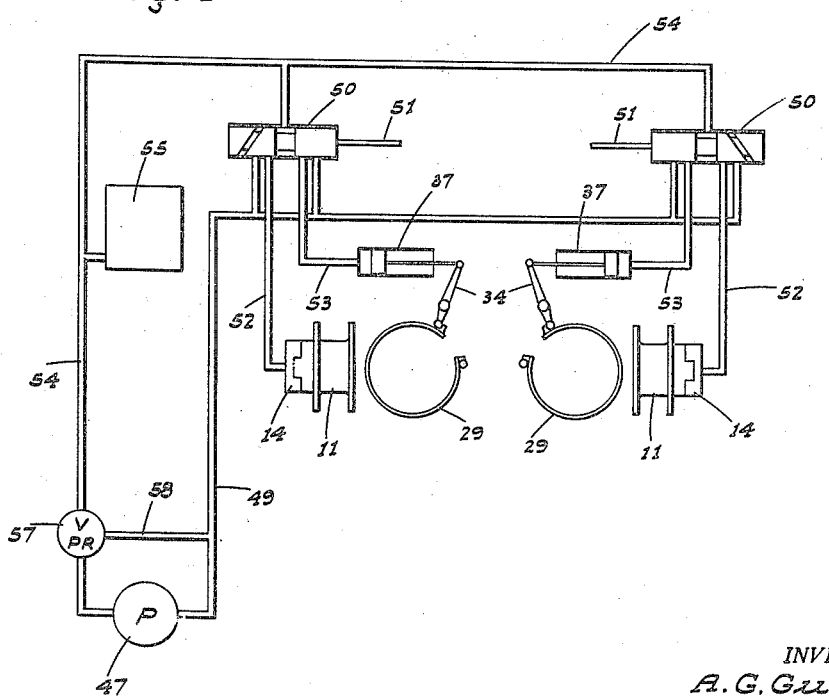
Fig. 4 is a diagram of the fluid pressure control system for the cable winch.

The brake assembly corresponding to each cable drum 11 and the adjacent clutch unit are interposed in a valve controlled, fluid pressure system, as shown diagrammatically in Fig. 4. This valve controlled, fluid pressure system comprises a pump 47, which pump is mounted in a manner clearly shown in Fig. 2. The pump is mounted in a manner so that it may be driven from the adjacent end of the worm 3 through the medium of a drive connection 48.

From the pump 47 fluid under pressure is delivered through a feed conduit 49 to valves 50, which valves each correspond to one of the cable drums. The valves 50 are mounted in direct connection with the winch, and each include a control handle 51. Said valves 50 are arranged, in the porting thereof, so that fluid pressure may be alternately fed to, or released from, conduits 52 and 53 which lead to the corresponding clutch unit 14 and power cylinder 37. The conduits 52 and 53 incorporate, as part thereof, the conduits 27 and 44, respectively.

When one of the valves 50 is set to feed fluid pressure to a clutch unit 14, the feed to the corresponding brake cylinder remains shut off. By this arrangement each brake assembly remains set, when the corresponding clutch is engaged, the brake, however, automatically releasing as the cable drum turns in a cable wind-up direction.

When each valve 50 is in its opposite position, fluid pressure from the clutch conduit 52 is bled into a return conduit 54, whereupon the corresponding clutch 14 disengages, while fluid feeds to conduit 53 to release the brake assembly. The return conduit 54 leads back to the input of the pump 47, and said return conduit is in communication with a reservoir 55 ahead of said pump. The reservoir 55 is formed as an integral part of the main case 1 at the back thereof, and includes a cover plate 56. A variable pressure relief valve 57 is interposed in the return conduit 54 between the reservoir 55 and pump 47, and is connected by a bypass conduit 58 with the feed conduit 49. In this manner pressure from the pump bypasses through conduit 58 when such pressure builds up beyond a predetermined value in conduit 49. By adjustment of the pressure relief valve 57, the working pressure of the system may be regulated.

As a safety feature each of the cable drums 11 is formed with a cable shield 59 which extends over the top part of each drum 11 and some distance down the sides thereof. At the front ends the shields 59 are connected by clamps 60 with the cross shaft 32, while at their rear ends the shields 59 are connected by clamps 61 with another cross shaft 62 on the main case 1.

The cable winch, as above described, provides an effective, practical, and rugged structure for the power control of cable; the clutch units as embodied in the winch being long-lived, and requiring a minimum of maintenance or repair. Any such maintenance or repair as may be necessary can be accomplished easily and quickly merely by the removal of the bolts 21, which permits of access to the entire assembly of the corresponding clutch unit.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful and upon which Letters Patent is desired:

In a winch, a driven shaft, a cable drum turnable on the shaft and formed at one end with an end head through which the shaft projects, a double-faced clutch disc splined on and enclosing the projecting portion of the shaft and disposed outwardly of the end head for frictional engagement therewith, a normally flat resilient metal diaparagm plate disposed outwardly of the clutch disc and shaft in position to frictionally engage and advance the disk upon inward bowing of the plate, a dome outwardly of the plate forming a pressure tight chamber therewith, and means to secure the dome and plate on the end head for rotation therewith; there being means to admit fluid under pressure to the chamber.

ALBERT G. GURRIES.
THOMAS B. KEESLING.

REFERENCES CITED

The following references are of record in the file of this patent:

UNITED STATES PATENTS

| Number | Name | Date |
|---|---|---|
| 1,831,083 | Stock | Nov. 10, 1931 |
| 2,138,393 | Wichtendahl | Nov. 29, 1938 |
| 2,143,861 | Clouse | Jan. 17, 1939 |
| 2,279,597 | Selmer | Apr. 14, 1942 |
| 2,326,935 | Ferguson | Aug. 17, 1943 |
| 2,349,494 | Fawick | May 23, 1944 |
| 2,378,225 | Lear et al. | June 12, 1945 |
| 2,401,172 | Maloon et al. | May 28, 1946 |
| 2,442,510 | Peterson et al. | June 1, 1948 |
| 2,495,463 | Le Tourneau | Jan. 24, 1950 |

FOREIGN PATENTS

| Number | Country | Date |
|---|---|---|
| 545,725 | Great Britain | June 9, 1942 |